UNITED STATES PATENT OFFICE.

JULIUS HACKERT, OF BRIDGEPORT, CONNECTICUT.

IMPROVED COMPOSITION FOR ARTIFICIAL IVORY.

Specification forming part of Letters Patent No. 42,942, dated May 31, 1864.

*To all whom it may concern:*

Be it known that I, JULIUS HACKERT, of Bridgeport, in the county of Fairfield and State of Connecticut, have invented a new and Improved Composition for Artificial Ivory; and I do hereby declare that the following is a full, clear, and exact description thereof, which will enable others skilled in the art to make and use the same.

This invention relates to a composition prepared of vinegar and nitric ether, and applied to the dust or shavings of bone, ivory, horn, or similar material in such a manner that by the application of steam and the addition of a small quantity of borax a mass is formed which can be pressed or molded in any desirable shape, and which, when dry and cold, becomes as hard and tenacious as natural ivory. The proportion in which I use the above-named ingredients is about as follows: white vinegar, eleven parts; nitric either, three parts. Of this mixture one pint is taken for a pound of the bone-dust, which must be carefully sieved and thoroughly saturated with the liquid. No more liquid ought to be employed, however, but just enough to saturate the dust. After the dust has been thoroughly saturated by this liquid, it is exposed for about three hours to the action of steam, and after the lapse of that time it becomes a gelatinous mass, which I mix with borax in about the following proportions: gelatinous mass of bone-dust, one pound; borax, one ounce. From this mixture the water is expelled by heat, and it forms a solid elastic body, which, before it has set, can be molded or formed into any desirable shape. After the mass has set, it can be turned on a turning-lathe, the same as ivory. It is hard and tough, and not liable to crack by changes in the temperature. It is not injured by moisture, and it can be used as a desirable substitute for ivory in the manufacture of billiard-balls, handles for cutlery, and other similar articles.

By the addition of coloring-matter any desirable color can be given to my composition, and in its manufacture the dust or shavings of horn or ivory may be used, as well as those of bone.

My composition is very cheap. It can be made perfectly white by bleaching, and it requires but little labor to finish off and polish its surface.

What I claim as new, and desire to secure by Letters Patent, is—

The above-described composition for artificial ivory, mixed together substantially in the manner and about in the proportions specified.

JULIUS HACKERT.

Witnesses:
JAMES L. GOULD,
E. A. PARROTT.